United States Patent
Akbari-Dilmaghani (10) Patent No.: US 12,470,042 B2
(45) Date of Patent: Nov. 11, 2025

(54) SELF-CALIBRATING DRIVER CIRCUIT

(71) Applicant: ams Sensors Asia Pte. Ltd., Singapore (SG)

(72) Inventor: Rahim Akbari-Dilmaghani, Eindhoven (NL)

(73) Assignee: ams Sensors Asia Pte. Ltd., Singapore (SG)

( * ) Notice: Subject to any disclaimer, the term of this patent is extended or adjusted under 35 U.S.C. 154(b) by 505 days.

(21) Appl. No.: 18/043,309

(22) PCT Filed: Aug. 25, 2021

(86) PCT No.: PCT/SG2021/050503
§ 371 (c)(1),
(2) Date: Feb. 27, 2023

(87) PCT Pub. No.: WO2022/045978
PCT Pub. Date: Mar. 3, 2022

(65) Prior Publication Data
US 2023/0299556 A1    Sep. 21, 2023

(30) Foreign Application Priority Data

Aug. 31, 2020 (GB) ..................... 2013640

(51) Int. Cl.
*H01S 5/042* (2006.01)
*H01S 5/06* (2006.01)
(Continued)

(52) U.S. Cl.
CPC .......... *H01S 5/0428* (2013.01); *H01S 5/0617* (2013.01); *H01S 5/06808* (2013.01); *H01S 5/06835* (2013.01)

(58) Field of Classification Search
CPC .. H01S 5/0428; H01S 5/0617; H01S 5/06216; H01S 5/06808; H01S 5/06835
See application file for complete search history.

(56) References Cited

U.S. PATENT DOCUMENTS 9,054,485 B1     6/2015  Ng
2003/0189961 A1* 10/2003 Tsuji ................. H01S 5/042
                                                  372/38.02
(Continued)

FOREIGN PATENT DOCUMENTS

CN      104682190 A       6/2015
CN      110635351 A      12/2019
(Continued)

OTHER PUBLICATIONS

Chinese office action with search report issued for the corresponding Chinese patent application No. 202180051783.4, dated Jul. 18, 2025, 6 pages (for the purpose of information only).
(Continued)

*Primary Examiner* — James A Menefee
(74) *Attorney, Agent, or Firm* — Viering, Jentschura & Partner mbB (57) ABSTRACT

A self-calibrating driver circuit (100, 300, 400, 500, 700) for a laser diode is disclosed. The circuit comprises a configurable current source (105, 305, 405, 505), a current mirror (115, 315, 415) configured to mirror a current from the configurable current source to a first transistor (120, 320, 420, 520, 720) and to a second transistor (125, 325, 425, 725), and a control circuit (140, 340, 440). The control circuit is configured to monitor a current through the first transistor at a first time, and to configure the current source based on the current through the first transistor to provide a desired current to the second transistor for driving the laser diode at a subsequent second time. A radiation-emitting device comprising one or more of the self-calibrating driver circuits and at least one radiation-emitting element is also disclosed.

15 Claims, 6 Drawing Sheets

(51) Int. Cl.
*H01S 5/068* (2006.01)
*H01S 5/0683* (2006.01)

(56) References Cited

U.S. PATENT DOCUMENTS

| | | |
|---|---|---|
| 2004/0136419 A1 | 7/2004 | Robinson et al. |
| 2004/0257140 A1 | 12/2004 | Bergmann et al. |
| 2005/0002429 A1* | 1/2005 | Nakatani ................ H01S 5/042 |
| | | 372/38.07 |
| 2005/0073268 A1 | 4/2005 | Schrodinger et al. |
| 2005/0213622 A1* | 9/2005 | Diaz ..................... H01S 5/0683 |
| | | 372/38.02 |
| 2006/0255838 A1 | 11/2006 | Bergmann |
| 2009/0230879 A1 | 9/2009 | Bergmann et al. |
| 2011/0051764 A1* | 3/2011 | Kamatani ............... H01S 5/042 |
| | | 372/38.04 |
| 2012/0027037 A1 | 2/2012 | Sumino et al. |
| 2019/0393674 A1 | 12/2019 | Lee et al. |
| 2020/0089267 A1 | 3/2020 | Wang et al. |

FOREIGN PATENT DOCUMENTS

| | | | |
|---|---|---|---|
| JP | H02196482 A | | 8/1990 |
| JP | H04180277 A | | 6/1992 |
| JP | H09321386 A | | 12/1997 |
| JP | 2001358661 A | * | 12/2001 |

OTHER PUBLICATIONS

Int'l. Search Report and Written Opinion for related PCT Patent Application No. PCT/SG2021/050503, issued Dec. 2, 2021, 9 pages.

Search Report issued in the related UK patent application No. GB2013640.4, dated Dec. 22, 2020, 4 pages.

* cited by examiner

SELF-CALIBRATING DRIVER CIRCUIT

CROSS-REFERENCES TO OTHER APPLICATIONS

This application is a United States National Phase application of International Patent Application Number PCT/SG2021/050503, filed Aug. 25, 2021, entitled "SELF-CALIBRATING DRIVER CIRCUIT", which application claims priority to U.K. patent application Ser. No. 2013640.4, for "SELF-CALIBRATING DRIVER CIRCUIT" filed on Aug. 31, 2020, the contents of which are incorporated herein by reference in their entirety.

TECHNICAL FIELD OF THE DISCLOSURE

The present disclosure is in the field of driver circuits for laser diodes and, in particular, driver circuits for Vertical Cavity Surface Emitting Lasers (VCSELs).

BACKGROUND

Laser diodes, and in particular VCSELs, are implemented in various optical devices, such as proximity sensors, time-of-flight sensors and infrared illuminators. Such optical devices may be commonly implemented in portable devices such as cellular telephones, tablets, laptops and smartphones, and other industrial and automotive applications, such as in LIDAR illuminators.

Many applications of laser diodes require precise control over the operation of the laser diode, which may be achieved by a correct and accurate control of a drive current and/or voltage level applied to the laser diode, at an appropriate timing.

Provision of a drive current and/or adequate voltage level may be provided to a laser diode by a driver circuit. Based on particular application requirements, such a driver circuit may be configured to drive one of more laser diodes.

However, existing driver circuits may exhibit several shortcomings that may be detrimental to an application employing such laser diodes, and in particular highly sensitive VCSELs. For example, existing driver circuits may exhibit a limited accuracy and/or stability. This may be due, at least in part, to a susceptibility of components of the circuit and/or of a technology the circuit is implemented in, to various influencing conditions such as environmental conditions and manufacturing process related drift.

Control of a laser diode may be critical in some use cases. For example, in eye-safety applications it may be essential that a provided drive current is sufficient to adequately stimulate a laser diode, yet not exceed a defined threshold that may cause the diode to exceed a radiation threshold, potentially causing eye-damage.

Although some laser diode driver circuits may implement some degree of monitoring, such monitoring and any adjustments to the driving of a diode made as a result of said monitoring, may be relatively slow to implement and ineffectual.

Furthermore, there is a general trend towards implementing increasingly large arrays of laser diodes, such as in VCSEL-based infrared illuminator applications. Existing laser diode driver circuits generally exhibit limited scalability and/or flexibility, and are therefore less suited to such applications.

It is therefore desirable to provide an accurate, low-complexity, and scalable laser diode driver circuit, particularly suitable for driving one or more VCSELs.

It is therefore an aim of at least one embodiment of at least one aspect of the present disclosure to obviate or at least mitigate at least one of the above identified shortcomings of the prior art.

SUMMARY

The present disclosure is in the field of driver circuits for laser diodes, and in particular driver circuits for Vertical Cavity Surface Emitting Lasers (VCSELs). In particular, the present disclosure relates to a self-calibrating driver circuit and a radiation-emitting device implementing said self-calibrating driver circuit According to a first aspect there is provided a self-calibrating driver circuit for a laser diode. The circuit comprises a configurable current source, a current mirror configured to mirror a current from the configurable current source to a first transistor and to a second transistor, and a control circuit. The control circuit is configured to monitor a current through the first transistor at a first time, and to configure the current source based on the current through the first transistor to provide a desired current to the second transistor for driving the laser diode at a subsequent second time.

Advantageously, by monitoring the current through the first transistor ahead of driving a laser diode using the second transistor, a more precise and accurate control of the laser diode may be achieved. For example, the monitoring of the current through the first transistor allows a drive current to be precisely tuned ahead of driving the laser diode.

Advantageously, the present disclosure describes a circuit wherein a current through the first transistor that may correspond to the drive current through the second transistor may be adjusted, such that a subsequent desired drive current through the second transistor is achieved. This in is contrast to prior art driver circuits, which may implement a real-time monitoring of a drive current or real-time monitoring of characteristics of radiation emitted by the laser diode, and then a subsequent adjustment of the driver circuit in response. That is, prior art circuits may initially drive a laser diode with an incorrect drive current, and then adjust the circuit such that subsequent pulses have a correct drive current, whereas the present disclosure describes a circuit that would avoid an erroneous initial drive current to the laser diode.

Furthermore, advantageously the disclosed self-calibrating driver circuit is easily scalable to drive a plurality of laser diodes. With only minor adjustments, as described below, the disclosed self-calibrating driver circuit may be readily configured to be addressable to drive individual diodes or diode arrays from a plurality of diodes or diode arrays.

In some embodiments, the first transistor may be substantially the same as the second transistor, i.e. fabricated as the same transistor type and size. As such, an accuracy of a determination of a drive current from the second transistor made using the first transistor may be improved.

The second transistor may be a drive transistor. That is, the second transistor may be adequately sized to handle a drive current for one or more laser diodes. Therefore, the second transistor may be substantially larger than one or more other transistors in the circuit or on a device implementing the circuit, such as transistor implementing digital circuitry. The second transistor may be fabricated in an LDMOS technology.

Advantageously, the second transistor may provide a means for driving a common n-contact of a VCSEL, or array of VCSELs, e.g. a 1D or 2D VCSEL array. As such, a cathode of the VCSEL(s) may be connected to a common GND and an anode of the VCSEL(s) may be coupled to the second transistor.

The control circuit may comprise a comparator configured to monitor the current through the first transistor by comparing a voltage across a resistor due to the current through the first transistor to a voltage reference.

The comparator may be a voltage comparator.

Beneficially, the comparator may provide a rapid indication of whether a voltage is above or below a desired level. The voltage reference may be defined by a user. For example, the voltage reference may be selected based upon a loading of the laser diode(s) on the driver circuit.

The self-calibrating driver circuit may be coupled to a user selectable or user programmable voltage reference.

The voltage reference may be derived from a potentiometer. A terminal of the potentiometer may be coupled to the current mirror. A terminal of the potentiometer may be coupled to the gate of each transistor forming the current mirror. That is, the potentiometer may be configured to define the voltage reference as a proportion of the voltage at the gate of each transistor forming the current mirror.

Advantageously, such a configuration ensures that any variation in the voltage at the gate of the transistors of the current mirror also directly affects the voltage reference, further enhancing an accuracy of the monitoring of the current through the first transistor, and configuration the current source based on said current.

The control circuit may comprise a comparator configured to monitor the current through the first transistor by comparing the current through the first transistor to a reference current.

The comparator may be a current comparator.

Beneficially, the comparator may provide a rapid indication of whether a current is above or below a desired level. The reference current may be defined by a user. For example, the reference current may be selected based upon a loading, or expected loading, of the laser diode(s) on the driver circuit.

The control circuit may comprise an analogue-to-digital converter (ADC) configured to monitor the current through the first transistor by measuring the current through the first transistor or a voltage due to the current through the first transistor.

Advantageously, an ADC provides a means to determine the current through the first transistor without having to provide a voltage reference in an analogue domain. That is, a threshold may be defined, e.g. programmed by the user or by a control circuit, in a digital domain, and the ADC may convert the voltage due to the current through the first transistor into a digital value that may be compared in the digital domain.

An input to the self-calibrating driver circuit may be a clock signal. A high level, or a transition to a high level, of the clock signal may corresponds to one of the first and the second time, and a low level or a transition to a low level of the clock signal may correspond to the other of the first and the second time.

An input to the self-calibrating driver circuit may be a clock signal. A duration of a high level of the clock signal may define one of the first and the second time. Similarly, a duration of a low level of the clock signal may define the other of the first and the second time.

Advantageously, by using a clock signal as an input to self-calibrating driver circuit, the clock signal may be used to modulate the laser diode. As such, in addition to controlling a drive current provided to a laser diode, the self-calibrating driver circuit may also control the duty-cycle and/or frequency of the diode, thus ensuring a high degree of controllability of the laser diode.

In one example, the duration of the high or low level of the clock signal may be in the region of five nanoseconds.

The self-calibrating driver circuit may comprise a trigger-circuit coupled to a gate of the first transistor and a gate of the second transistor.

The trigger-circuit may be configurable between a first and second state.

In the first state a voltage at the gate of the first transistor may enable current flow through the first transistor and a voltage at the gate of the second transistor may inhibit current flow through the second transistor.

In the second state a voltage at the gate of the first transistor may inhibit current flow through the first transistor and a voltage at the gate of the second transistor may enable current flow through the second transistor.

Advantageously, such a circuit may enable a level of current from the current mirror to be monitored and adjusted accordingly, before said current is used to drive a one or more laser diodes through the second transistor.

The trigger circuit may be configured to shift a voltage level of a signal. That is, a trigger signal, which may be the above-mentioned clock signal, may have a first voltage level, and one or more outputs from the trigger circuit may have a second, different voltage level. For example the trigger signal may be provided by a CMOS digital circuitry operating at 0.8V, 1.1V, 1.2V, or the like, whereas the one or more outputs from the trigger circuit may have a voltage level of 3.3V, 5.0V, 12V, 24V, or the like. As such, the trigger circuit may be configured to isolate low-voltage digital circuitry from the high-voltage self-calibrating driver circuit.

The control circuit may comprise a bidirectional counter, wherein a direction of counting of the bidirectional counter may correspond to the monitored current, and a value of the counter may correspond to a configuration of the current source.

The bidirectional counter may be configured to increase a count if the monitored current through the first transistor at the first time is below the reference current, and decrease the count if the monitored current through the first transistor at the first time is above a reference current, or vice versa.

The bidirectional counter may be configured to increase a count if the monitored voltage across the resistor due to the current through the first transistor at the first time is below the voltage reference, and decrease a count if the monitored voltage across the resistor due to the current through the first transistor at the first time is above the voltage reference, or vice versa.

In response to an increase or decrease in the count, the configurable current source may be configured to provide a higher or lower current.

The configurable current source may comprise a plurality of individual current sources. The configurable current source may comprise a programmable array of individual current sources. In response to an increase or decrease in the count, the configurable current source may enable or disable one or more of the individual current sources to increase or decrease an overall current provided by the configurable current source.

For example, the configurable current source may be configurable to provide 12Amps, or even more, for driving an array of laser diodes.

The control circuit is configured to monitor a current through the first transistor at a first time, and to configure the current source based on the current through the first transistor to provide a desired current to the second transistor for driving the laser diode at a subsequent second time.

As such, the control circuit may implement a feedback loop based on a current flow through the first transistor, for subsequently controlling a current flow to the second transistor for driving one or more laser diodes.

The control circuit may comprise processing circuitry for configuring the current source based on the monitored current.

The processing circuitry may comprise a CPU. The processing circuitry may comprise a state machine. The processing circuitry may comprise combinatorial logic.

The processing circuitry may comprise a memory, the memory holding instructions for execution by the CPU.

The self-calibrating driver circuit may be fabricated in a High Voltage Bipolar-CMOS-DMOS (HV-BCD) process.

Advantageously, by implementing the self-calibrating driver circuit using a Bipolar-CMOS-DMOS (BCD) process, some components of the circuit, e.g. the first and second transistors, may be implemented as high voltage devices, whereas low voltage standard CMOS devices may be used for other components of the circuit, such as the digital bidirectional counter. Beneficially, the use of low voltage standard CMOS devices allows necessary components of the circuit to be more accurate than would otherwise be achievable if HV devices were used. Furthermore, low voltage standard CMOS devices may be implemented using low-cost and industry-standard fabrication processes. Furthermore, the use of HV-BCD enables the self-calibrating driver circuits to be implemented as a fully integrated architecture, e.g. to be implemented as monolithic devices, and potentially integrated with further circuits or components.

According to a second aspect of the disclosure, there is provided a laser diode driver comprising a plurality of self-calibrating driver circuits according to the first aspect.

The plurality of self-calibrating driver circuits may comprise a common control circuit, or a common portion of the control circuit. For example, the plurality of self-calibrating driver circuits may share common processing circuitry.

That is, the common control circuit may be configured to monitor a current through the each first transistors of each of the plurality of self-calibrating driver circuits at a first time. The common control circuit may be configured to configure the current source of each of the plurality of self-calibrating driver circuits, based on the current through each first transistor, to provide a desired current to each of the second transistors of each of the plurality of self-calibrating driver circuits, for driving one or more laser diodes at a subsequent second time.

Advantageously, such a modular and segmented architecture of a laser diode driver implementing a plurality of self-calibrating driver circuits may be designed and optimized for speed and accuracy, and may be configured to obtain a required high current level and/or run multiple individual diode arrays.

Each self-calibrating driver circuit may comprise a third transistor coupled to an output from the current mirror for selectively inhibiting current flow from the current mirror to the respective first transistor and/or second transistor.

Each third transistor may be used to individually address, e.g. enable/disable, a particular self-calibrating driver circuit of the plurality of self-calibrating driver circuits. As such, a laser diode driver according to the second aspect may be used to precisely control an array of laser diodes, wherein individual diodes or groups of diode within the array may be individually isolated from an associated self-calibrating driver circuit.

Advantageously, such flexible addressing of a particular self-calibrating driver circuit, and hence of a particular diode or array of diodes, may improve an overall area efficiency of a device implementing the self-calibrating driver circuits.

An output of the second transistor of each of the self-calibrating driver circuits of the plurality of self-calibrating driver circuits may be coupled to one or more radiation-emitting devices.

For example, a plurality of the self-calibrating driver circuits may be configured to drive a single diode or an array of diodes. As such, high currents, such as 12 amps or the like, maybe provided to a single diode or an array of diodes.

According to a third aspect of the disclosure, there is provided a radiation-emitting device comprising one or more self-calibrating driver circuits according to the first aspect, and at least one radiation-emitting element. The one or more self-calibrating driver circuits is configured to drive the at least one radiation-emitting device to emit radiation.

The radiation-emitting device may be a proximity sensor, a time-of-flight sensor, an illuminator, or the like.

The at least one radiation-emitting element may comprise one or more laser diodes.

The at least one radiation-emitting element may comprise one or more VCSELs.

Each self-calibrating driver circuit may be individually addressable to drive one or more of the at least one radiation-emitting elements.

According to a fourth aspect of the present disclosure, there is provided an apparatus comprising a radiation-emitting device according to the third aspect. The apparatus is one of a cellular telephone, a smartphone, a tablet, a laptop, or a LIDAR arrangement, or the like. The radiation-emitting device is one of a proximity sensor, a time-of-flight sensor, an illuminator, or the like.

The above summary is intended to be merely exemplary and non-limiting. The disclosure includes one or more corresponding aspects, embodiments or features in isolation or in various combinations whether or not specifically stated (including claimed) in that combination or in isolation. It should be understood that features defined above in accordance with any aspect of the present disclosure or below relating to any specific embodiment of the disclosure may be utilized, either alone or in combination with any other defined feature, in any other aspect or embodiment or to form a further aspect or embodiment of the disclosure.

BRIEF DESCRIPTION OF THE PREFERRED EMBODIMENTS

These and other aspects of the present disclosure will now be described, by way of example only, with reference to the accompanying drawings, wherein.

DETAILED DESCRIPTION OF THE DRAWINGS

Figure 1:
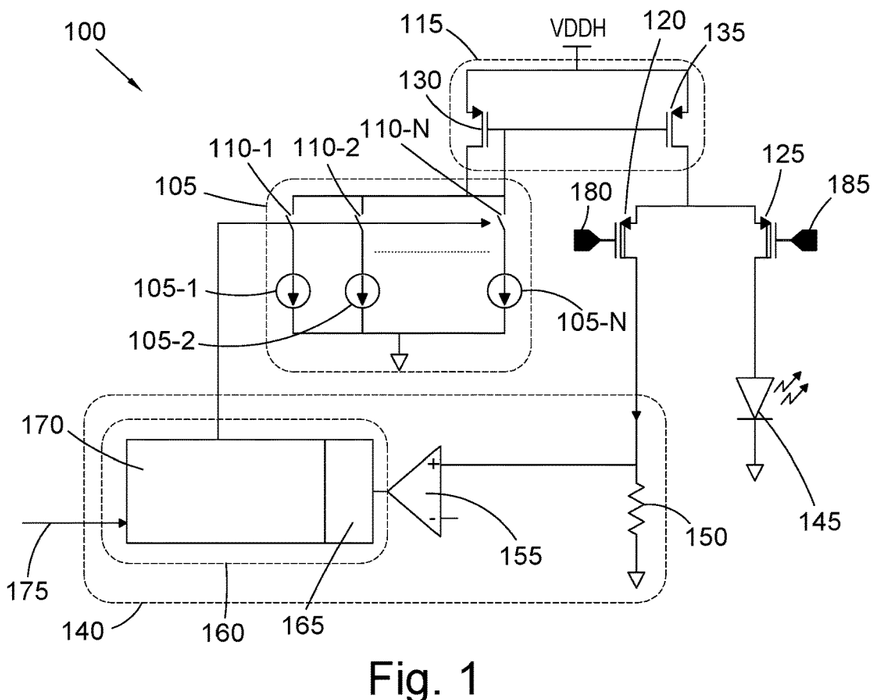
FIG. 1 depicts a self-calibrating driver circuit for a laser diode, according to an embodiment of the disclosure.

FIG. 1 depicts a self-calibrating driver circuit 100 for a laser diode, according to an embodiment of the disclosure.

The self-calibrating driver circuit 100 comprises a configurable current source 105. In the example embodiment of FIG. 1, the configurable current source 105 comprises a plurality of individual current sources, 105-1, 105-2, . . . 105-N. That is, the configurable current source 105 comprise a programmable array of individual current sources 105-1, 105-2, . . . 105-N. Each individual current source 105-1, 105-2, . . . 105-N has an associated switch 110-1, 110-2, . . . 110-N. As such, by opening or closing a particular combination of switches 110-1, 110-2, . . . 110-N, a total current provided by the configurable current source 105 may be selected, as described in more detail below.

In some embodiments, each of the individual current sources 105-1, 105-2, . . . 105-N may provide a substantially equal amount of current, such that a total current provided by the configurable current source 105 is proportional to an amount of switches 110-1, 110-2, . . . 110-N that are closed.

In some embodiments, one or more of the individual current sources 105-1, 105-2, . . . 105-N may provide a different amount of current relative to others of the the individual current source 105-1, 105-2, . . . 105-N, such that a total current provided by the configurable current source 105 is selectable based upon a particular combination of switches 110-1, 110-2, . . . 110-N that are closed.

It will be appreciated that the configurable current source 105 comprising an array of individual current sources 105-1, 105-2, . . . 105-N is provided as an example embodiment. In other embodiments, alternative programmable current sources may be implemented.

The self-calibrating driver circuit 100 comprises a current mirror 115. The current mirror 115 is configured to mirror a current from the configurable current source 105 to a first transistor 120 and to a second transistor 125. It will be appreciated that in some embodiments, other current mirror circuits may be implemented. In some embodiments, the current mirror may be implemented as a current-controlled current source.

In the example embodiment of FIG. 1, the current mirror 115 comprises a third transistor 130 and a fourth transistor 135. A source of the third transistor 130 is coupled to a high voltage supply, denoted VDDH. A drain of the third transistor 130 is coupled to an output of the configurable current source 105. A gate of the third transistor 130 is also coupled to the output of the configurable current source 105.

The gate of the third transistor 130 is coupled to a gate of the fourth transistor 135. A source of the fourth transistor 135 is coupled to the supply, denoted VDDH. A drain of the fourth transistor 135 is coupled to the source of the first transistor 120 and the source of the second transistor 125.

As such, the third transistor 130 and the fourth transistor 135 are operable to mirror a current from the output of the configurable current source 105 to the source of the first transistor 120 and to the source of the second transistor 125. That is, by implementing such a current mirror 115, an amount of current from the configurable current source 105 as seen at the drain of the third transistor 130 is decoupled from a loading seen at the drain of the fourth transistor 135.

As described above, the source of the first transistor 120 is coupled to an output from the current mirror 115. A gate of the first transistor 120 is a first input 180 to the self-calibrating driver circuit 100. The first input 180 to the self-calibrating driver circuit 100 may be coupled to a first output 225 from a trigger circuit 200, as described in more detail below with reference to FIG. 2. A drain of the first transistor 120 is coupled to a control circuit 140 for monitoring a current through the first transistor 120 at a first time 265, and to configure the current source 105 based on the current through the first transistor 120 to provide a desired current to the second transistor 125 for driving a laser diode 145 at a subsequent second time 270, as described in more detail below.

The source of the second transistor 125 is coupled to an output from the current mirror 115. A gate of the second transistor 125 is a second input 185 to the self-calibrating driver circuit 100. The second input 185 may be coupled to a second output 230 from the trigger circuit 200, as described in more detail below with reference to FIG. 2. A drain of the second transistor 125 is coupled to the laser diode 145. As such, the second transistor 125 is configured to drive the laser diode 145.

It will be appreciated that FIG. 1 depicts a single laser diode 145 for purposes of example only. In other embodiments, the self-calibrating driver circuit 100 may be configured to drive a plurality of diodes, such as an array of diodes. In yet further embodiments, the self-calibrating driver circuit 100 may be configurable to drive a plurality of groups of diodes, wherein each group comprises one or more diodes. In other embodiments, the self-calibrating driver circuit 100 may be configured to drive other arrangements of diodes, as described in more detail below with reference to FIG. 8.

In the example embodiment of FIG. 1, the control circuit 140 comprises a first resistor 150, wherein the first resistor 150 has a terminal coupled to the drain of the first transistor 120, and a terminal coupled to a fixed reference. In the example embodiment of FIG. 1, the fixed reference is a ground, e.g. 0V. As such, a current flowing from the drain of the first transistor 120 through the first resistor 150 to the voltage reference will incur a voltage across the first resistor 150. That is, the voltage incurred at a terminal of the first resistor 150 is indicative of a current flowing through the first resistor 150.

The control circuit 140 also comprises a comparator 155. A first input of the comparator 155 is coupled to the drain of the first transistor 120. As such, a voltage incurred at a terminal of the first resistor 150 is present at the first input of the comparator 155.

A second input to the comparator 155 is coupled to a voltage reference. The voltage reference may be provided by a further circuit (not shown). As such, the comparator 155 may be configured to provide a rapid indication of whether the voltage incurred at a terminal of the first resistor 150 is above or below the voltage reference.

In some embodiments the voltage reference may be defined by a user. For example, the voltage reference may be selected based upon a loading of the laser diode(s) on the driver circuit. The second input to the comparator 155 may be coupled to a user selectable or user programmable voltage reference.

An output of the comparator 155 may be coupled to processing circuitry 160. For example, in some embodiments the processing circuitry 160 may comprise a CPU. In some embodiments, the processing circuitry 160 may comprise combinatorial logic. In some embodiments, the processing circuitry 160 may comprise a memory, the memory holding instructions for execution by the CPU.

In the example embodiment of FIG. 1, the processing circuitry 160 comprises a finite state machine (FSM) 165 and a bidirectional counter 170.

An input to the processing circuitry 160 is a first clock signal 175. As such, in the example embodiment of FIG. 1, the processing circuitry 160 represents a sequential logic implementation. In other embodiment, the processing circuitry 160 may be implemented as combinational logic.

The FSM is configured to increment or decrement the bidirectional counter based upon an output from the comparator 155. In some embodiments, the FSM may also be configurable to maintain the bidirectional counter at a previous value based upon an output from the comparator 155.

For example, in some embodiments if the output of the comparator 155 indicates that the voltage incurred at a terminal of the first resistor 150 has exceeded the voltage reference, then the FSM may be configured to increment the bidirectional counter 170, and if the output of the comparator 155 indicates that the voltage incurred at a terminal of the first resistor 150 is less than the voltage reference, then the FSM may be configured to decrement the bidirectional counter 170.

In other embodiments, an opposite arrangement may be implemented, e.g. if the output of the comparator 155 indicates that the voltage incurred at a terminal of the first resistor 150 has exceeded the voltage reference, then the FSM may be configured to decrement the bidirectional counter 170, and if the output of the comparator 155 indicates that the voltage incurred at a terminal of the first resistor 150 is less than the voltage reference, then the FSM may be configured to increment the bidirectional counter 170.

An output of the bidirectional counter 170 is coupled to the switches 110-1, 110-2, . . . 110-N. As such, the amount of switches 110-1, 110-2, . . . 110-N that are opened or closed may depend upon a count of the bidirectional counter 170. The count of the bidirectional counter 170 may be configured to select the particular amount and/or combination of switches 110-1, 110-2, . . . 110-N that are opened or closed, thus defining an amount of current that the configurable current source 105 provides.

A direction of counting of the bidirectional counter may correspond to a monitored current through the first resistor 150, and a value of the bidirectional counter 170 may correspond to a configuration of the current source 105.

The self-calibrating driver circuit 100 may be implemented using a high voltage Bipolar-CMOS-DMOS (BDC) process. For example, in some embodiments, at least the second transistor 125 may be implemented as a lateral diffused MOS (LDMOS) transistor.

The second transistor 125 may be adequately sized for providing a sufficient drive current and voltage to the laser diode 125, or to a plurality of laser diodes as described above. For example, in some embodiments, the second transistor 125 may be capable of driving a current in the region of 12 Amps, or more, to the laser diode 125, or to a plurality of laser diodes. In some embodiments, VDDH may be 12V, 24V or even higher.

Similarly, the first transistor 120 may be implemented as an LDMOS transistor. As such, characteristics of the first transistor 120 may be more closely configured to correspond to characteristics of the second transistor 125, such that monitoring of a current through the first transistor 120 provides an accurate means of estimating a subsequent current through the second transistor 125.

In some embodiments, LDMOS transistors may be used selectively in the self-calibrating driver circuit 100, depending upon particular high voltage and/or high current requirements. For example, as described above transistors used for driving a laser diode array may be implemented in LDMOS to achieve the necessary high voltages and/or currents required, whereas other components in the circuit may be implemented using a low voltage CMOS technology. Advantageously, the use of low voltage CMOS technology may improve an accuracy of the self-calibrating driver circuit 100. Furthermore, low voltage CMOS technology may be implemented using standard process that are relatively low cost and efficient to implement. That is, high voltage BCD technologies may be bulky, exhibiting large parasitic capacitances, and implementing such a circuits as embodied in FIG. 1 in such technologies may result in a limited accuracy. Therefore, integration of LDMOS drivers into a low voltage CMOS technology may improve the accuracy of control of a current to the laser diodes.

Figure 2:
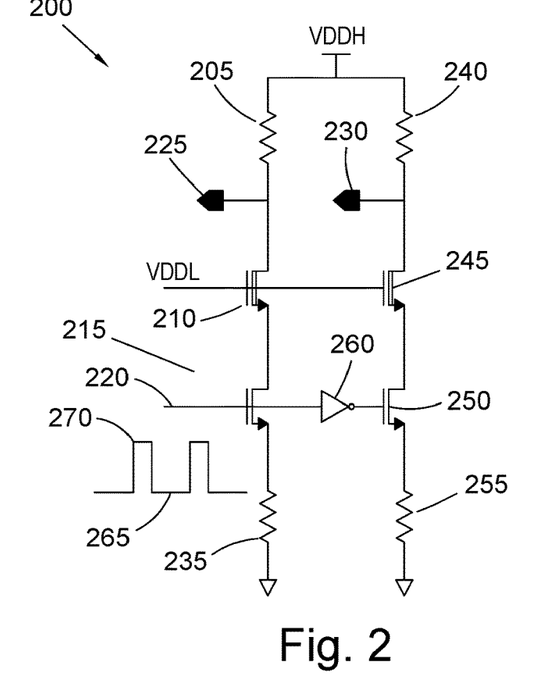
FIG. 2 depicts a trigger circuit for a self-calibrating driver circuit for a laser diode, according to an embodiment of the disclosure.

FIG. 2 depicts the trigger circuit 200 for the self-calibrating driver circuit 100. The trigger circuit 200 comprises a second resistor 205 coupled between the high voltage supply, denoted VDDH, and a drain of a fifth transistor 210. A gate of the fifth transistor 210 is coupled to a low voltage supply, denoted VDDL.

The low voltage supply, VDDL, may be a supply for the low-voltage CMOS circuitry. For example, the low voltage supply, VDDL, may be 5V, 3.3V, 1.8V, 1.1V, or less. In some embodiments, at least a portion of the control circuit 140 may comprise low-voltage CMOS circuitry, and therefor may be supplied by the low voltage supply, VDDL.

A source of the fifth transistor 210 is coupled to the drain of a sixth transistor 215. A third resistor 235 is coupled between the source of the sixth transistor 215 and the fixed reference, which in the example embodiment of FIG. 2 is a ground, e.g. 0V.

A gate of the sixth transistor 215 is coupled to a second clock signal 220.

A drain of the fifth transistor is coupled to the first output 225 from the trigger circuit 200. For example, when the trigger circuit 200 of FIG. 2 is used with the self-calibrating driver circuit 100 of FIG. 1, the first output 225 from the trigger circuit 200 is coupled to first input 180 of the self-calibrating driver circuit 100 of FIG. 1, e.g. the gate of the first transistor 120.

The trigger circuit 200 comprises a fourth resistor 240 coupled between the high voltage supply, denoted VDDH, and a drain of a seventh transistor 245. A gate of the seventh transistor 245 is coupled to the low voltage supply, denoted VDDL.

A source of the seventh transistor 245 is coupled to the drain of an eighth transistor 250. A fifth resistor 255 is coupled between the source of the eighth transistor 250 and the fixed reference, which in the example embodiment of FIG. 2 is a ground, e.g. 0V.

The trigger circuit 200 comprises an inverter 260. An input to the inverter 260 is the second clock signal 220. The output of the inverter 260 is coupled to a gate of the eighth transistor 250. As such, the gate of the sixth transistor 215 is the inverse of the gate of the eighth transistor 250. For example, when the gate of the sixth transistor 215 is at 0V, the gate of the eighth transistor 250 may be at VDDL, and vice versa.

A drain of the seventh transistor 245 is coupled to the second output 230 from the trigger circuit 200. For example, when the trigger circuit 200 of FIG. 2 is used with the self-calibrating driver circuit 100 of FIG. 1, the second output 230 from the trigger circuit 200 is coupled to second input 185 of the self-calibrating driver circuit 100 of FIG. 1, e.g. the gate of the second transistor 125.

The trigger circuit 200 may operate as a level shifter. That is, an input to the trigger circuit, which is the second clock signal 215 may be provided at a low voltage level, e.g. VDDL. The outputs from the trigger circuit 200, e.g. the first output 225 and the second output 230 may be provided by the trigger circuit 200 to a self-calibrating driver circuit, e.g. the circuit of FIG. 1, at or close to a high voltage level, e.g. VDDH.

As such, the trigger circuit 200 may provide an efficient means to couple a low-voltage circuit providing the second clock signal 200 to a high voltage circuit such as at least a portion of the self-calibrating driver circuit 100.

In some embodiments, a duration of a high level of the second clock signal 220 may define one of the first and the second time. Similarly, a duration of a low level of the second clock signal 220 may define the other of the first and the second time.

In the example embodiment of FIG. 2, a duration of a high level of the second clock signal 220 defines the second time 270, e.g. the time when the self-calibrating driver circuit 100 is configured to drive the laser diode 145. That is, when the second clock signal 220 is at a logic high level, an output from the inverter 260 drives the gate of the eighth transistor 250 to a logic low level, thereby disabling current flow through the eighth transistor 250 and asserting the second output 230 to a high level. In embodiments wherein the trigger circuit 200 is coupled to the self-calibrating driver circuit 100 of FIG. 1, the high level at the second output 230 provides a high level to the second input 185 of the self-calibrating driver circuit 100, thereby enabling the second transistor 125 such that current may flow from the current mirror 115 through the second transistor 125 to drive the laser diode 145.

During the second time 270, the second clock signal 220 drives the gate of the eighth transistor 250 to a logic high level, thereby enabling current flow through the eighth transistor 250 and negating the first output 225. In embodiments wherein the trigger circuit 200 is coupled to the self-calibrating driver circuit 100 of FIG. 1, the low level at the first output 225 provides a low level to the first input 180 of the self-calibrating driver circuit 100, thereby disabling the first transistor 120 such that current flow from the current mirror 115 through the first transistor 120 is inhibited.

In contrast, during the first time 265 of the second clock signal 220, e.g. when the second clock signal 220 is a logic low level, the first output 225 is driven high and the second output 230 is driven low. As such, when the trigger circuit 200 is used with the self-calibrating driver circuit 100 of FIG. 1, the during the first time 265 of the second clock signal 220 current flow from the current mirror 105 to the laser diode 145 is inhibited, and current flow from the current mirror 105 to the control circuit 140 is enabled.

Therefore, the trigger-circuit 200 is configurable between a first and second state. The first state corresponds to the first time 265, wherein a voltage at the gate of the first transistor 120 enable current flow through the first transistor 120 for monitoring and control of the current, and a voltage at the gate of the second transistor 125 inhibits current flow through the second transistor.

The second state corresponds to the second time 270, wherein a voltage at the gate of the first transistor 120 inhibits current flow through the first transistor 120 and a voltage at the gate of the second transistor 125 enables current flow through the second transistor 120 to drive one or more laser diodes 145.

Continuing with the example embodiment of FIG. 1, during the first time 265 the control circuit 140 may be configured to monitor the current through the first transistor 120 by comparing a voltage incurred at the first resistor 150 due to current flowing through the first transistor 120 to a voltage reference, as described above. Furthermore, during the first time 265, the control circuit 140 may be configured to configure the current source 105 based on the current through the first transistor 120 to provide a desired current to the second transistor 125 for driving the laser diode 145 at the subsequent second time 170.

Advantageously, the above-described embodiments are particularly suitable for applications that require a very short pulse in the region of 5 nanoseconds or less and/or a high current, such as 12 Amps, for driving a plurality of laser diodes, e.g. VCSELs.

Advantageously, the above-described embodiments provide an integrated means to accurately control a current for driving one or more diodes with a well-controlled programmable current level. The above-described embodiments are suitable for driving 1D/2D VCSEL arrays and, in particular, may provide constant current pulses.

In some embodiments, a duty cycle and/or frequency of the second clock signal 220 may be controlled to modulate the one or more laser diodes.

Figure 3:
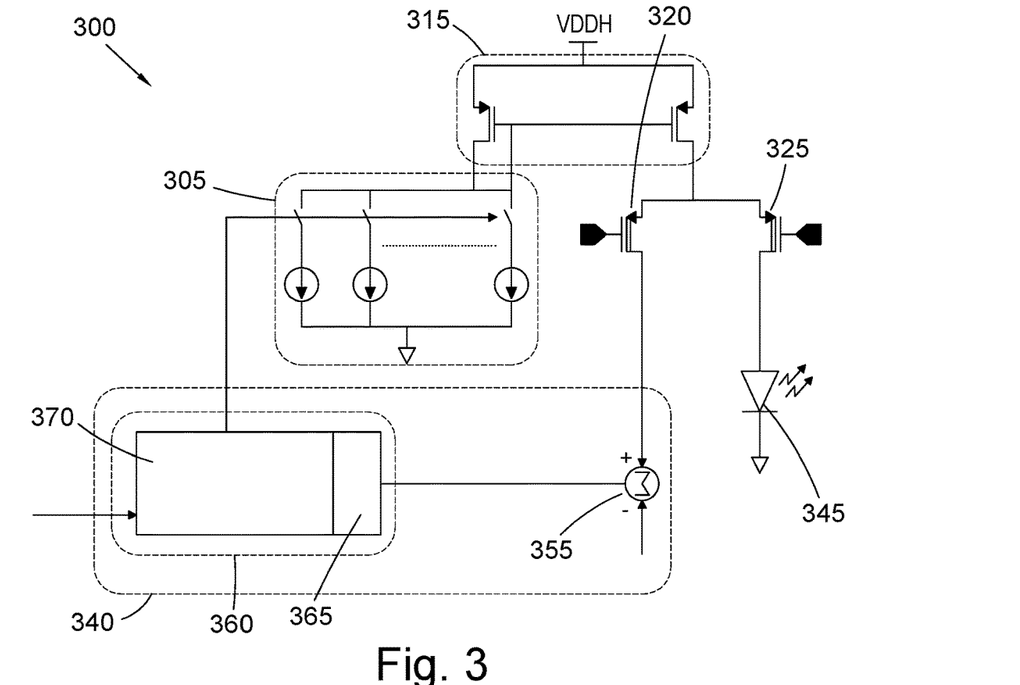
FIG. 3 depicts a self-calibrating driver circuit for a laser diode, according to a further embodiment of the disclosure.

FIG. 3 depicts a self-calibrating driver circuit 300 for a laser diode, according to a further embodiment of the disclosure. The self-calibrating driver circuit 300 comprises a configurable current source 305. The configurable current source 305 is generally the same as the configurable current source 105 of FIG. 1, and is therefore is not described in any further detail.

The self-calibrating driver circuit 300 also comprises a current mirror 315 configured to mirror a current from the configurable current source 305 to a first transistor 320 and to a second transistor 325. The arrangement of the current mirror 315 and the first and second transistors 320, 325 is generally the same as the arrangement of the current mirror 115 and the first and second transistors 120, 125 of FIG. 1, and is therefore not described in any further detail. The second transistor 325 is also configured to drive one or more laser diodes 345, similar to the second transistor 125 of FIG. 1.

The example embodiment of FIG. 3 also comprises a control circuit 340. The control circuit 340 comprises processing circuitry 360, which also comprises a finite state machine 365 and a bidirectional counter 370, similar to the embodiment of FIG. 1.

However, in contrast to the embodiment of FIG. 1, a current from the first transistor 320 is directly compared against a reference current using a current comparator 355. That is, instead of generating a voltage across a resistor 150 and using a voltage comparator 155 as shown in FIG. 1, instead the embodiment of FIG. 3 implements a current comparator 355 for directly comparing a current through the first transistor 320 to a reference current.

In some embodiments, the reference current may be defined by a user. For example, the reference current may be selected based upon a loading, or expected loading, of the laser diode(s) on the self-calibrating driver circuit 300. The reference current may be provided by a further circuit (not shown). The reference current may be programmable. For example, depending upon a quantity of laser diodes 345 and/or characteristics of one or more laser diodes 345, a reference current may be selected or programmed such that the control circuit 340 configures the configurable current source 305 to provide a sufficient and/or predefined level of current, to the one or more laser diodes 345.

It will be appreciated that the self-calibrating driver circuit 300 may be coupled to the example trigger circuit 200 of FIG. 2.

Figure 4:
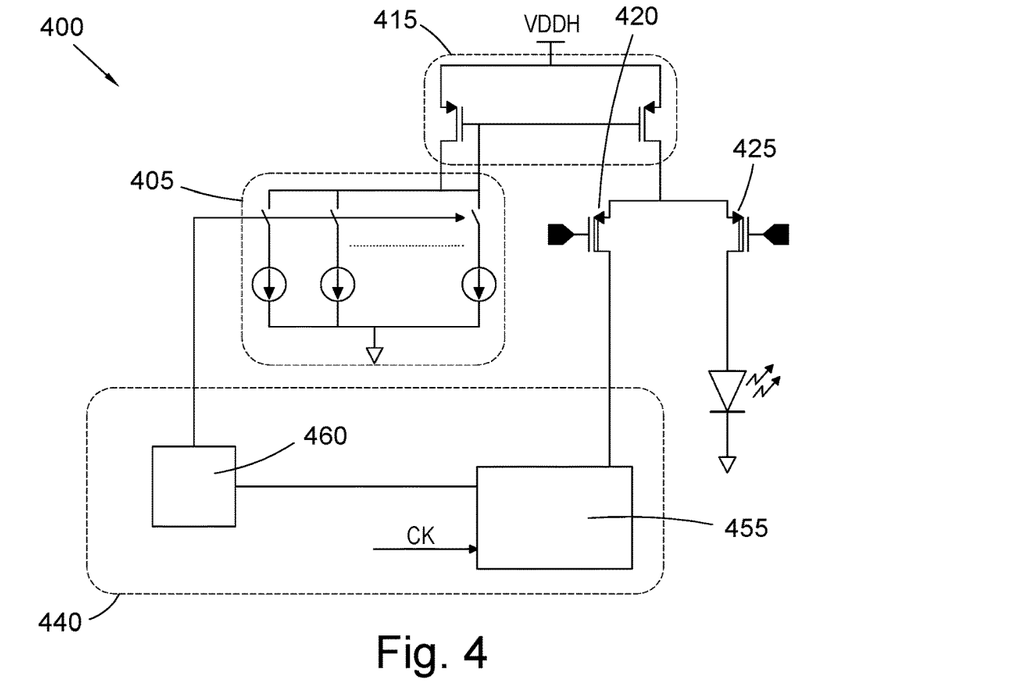
FIG. 4 depicts a self-calibrating driver circuit for a laser diode, according to a further embodiment of the disclosure.

FIG. 4 depicts a further self-calibrating driver circuit 400 for a laser diode, according to a further embodiment of the disclosure.

The self-calibrating driver circuit 400 comprises a configurable current source 405, a current mirror 415, a first transistor 420 and a second transistor 425, which corresponds to the equivalent features of FIGS. 1 and 3, and are therefore not described in further detail.

In contrast to the embodiments of FIGS. 1 and 3, the control circuit 440 comprises a processor 460. The processor 460 may be a central processing unit (CPU) or the like. As will be appreciated by one of skill in the art, the processor 460 may have associated circuitry and features (not shown) such as a ROM, RAM, EEPROM, debug circuitry, buses, and the like.

The control circuit 440 also comprises an ADC 455. The ADC 455 is a current-mode ADC 455. As such, the ADC may be configured to directly measure a current through the first transistor 420. The ADC may provide a signal to the processor 460, wherein the signal is indicative of a level of current flowing through the first transistor 420. The processor may be programmed to configure the configurable current source 405 based upon the signal from the ADC 455.

In yet a further embodiment (not shown), the ADC 455 may instead be implemented as a voltage-mode ADC, configured to measure a voltage across a resistor incurred as a result of a current flowing through the first transistor 420.

Figure 5:
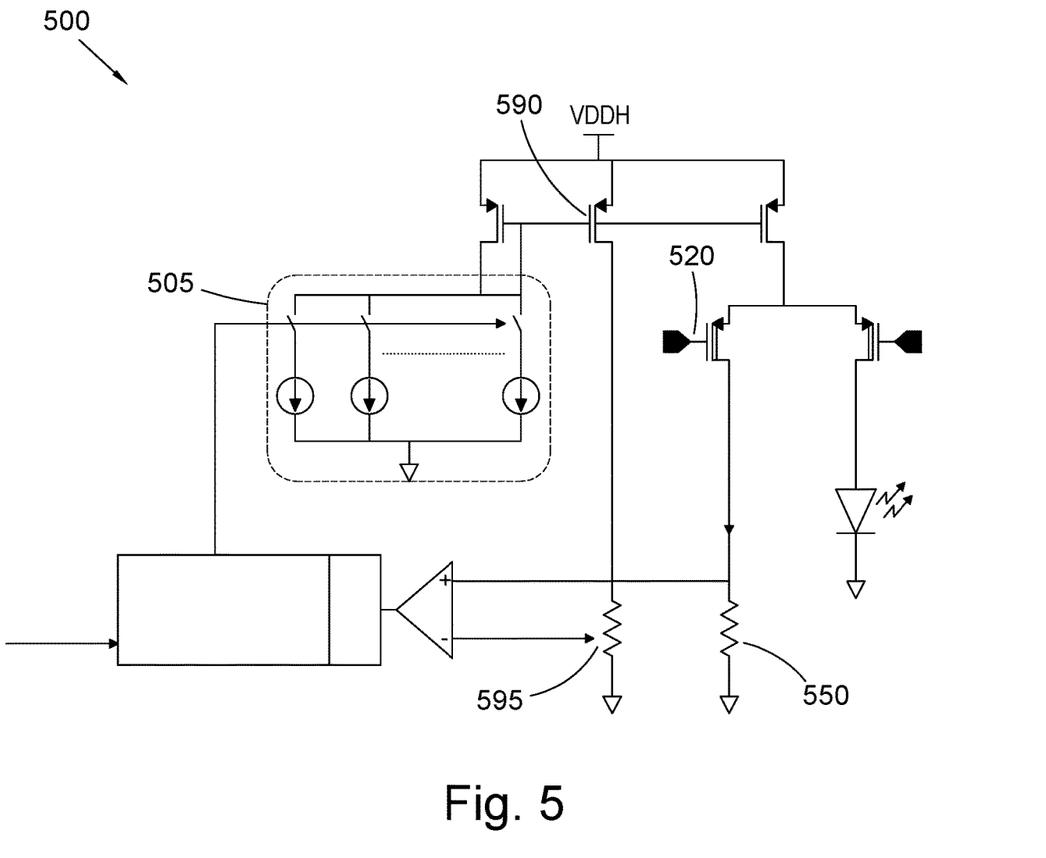
FIG. 5 depicts a self-calibrating driver circuit for a laser diode, according to a further embodiment of the disclosure.

FIG. 5 depicts a self-calibrating driver circuit 500 for a laser diode, according to a further embodiment of the disclosure. The self-calibrating driver circuit 500 comprises all of the features of the self-calibrating driver circuit 100 of FIG. 1. In particular, the self-calibrating driver circuit 500 comprises a comparator configured to compare a voltage at the drain of a first transistor 520, e.g. a voltage incurred at a terminal of a first resistor 550, to a voltage reference.

The self-calibrating driver circuit 500 comprises a reference transistor 590. A source of the reference transistor 590 is coupled to the high voltage supply, denoted VDDH. A gate of the reference transistor 590 is coupled to an output from a configurable current source 505. A reference resistor 595 is coupled between the drain of the reference transistor 590 and the ground reference. As such, a current from the configurable current source 505 may be mirrored by the reference transistor 590 such that the voltage reference is incurred across the reference resistor 595.

Figure 6:
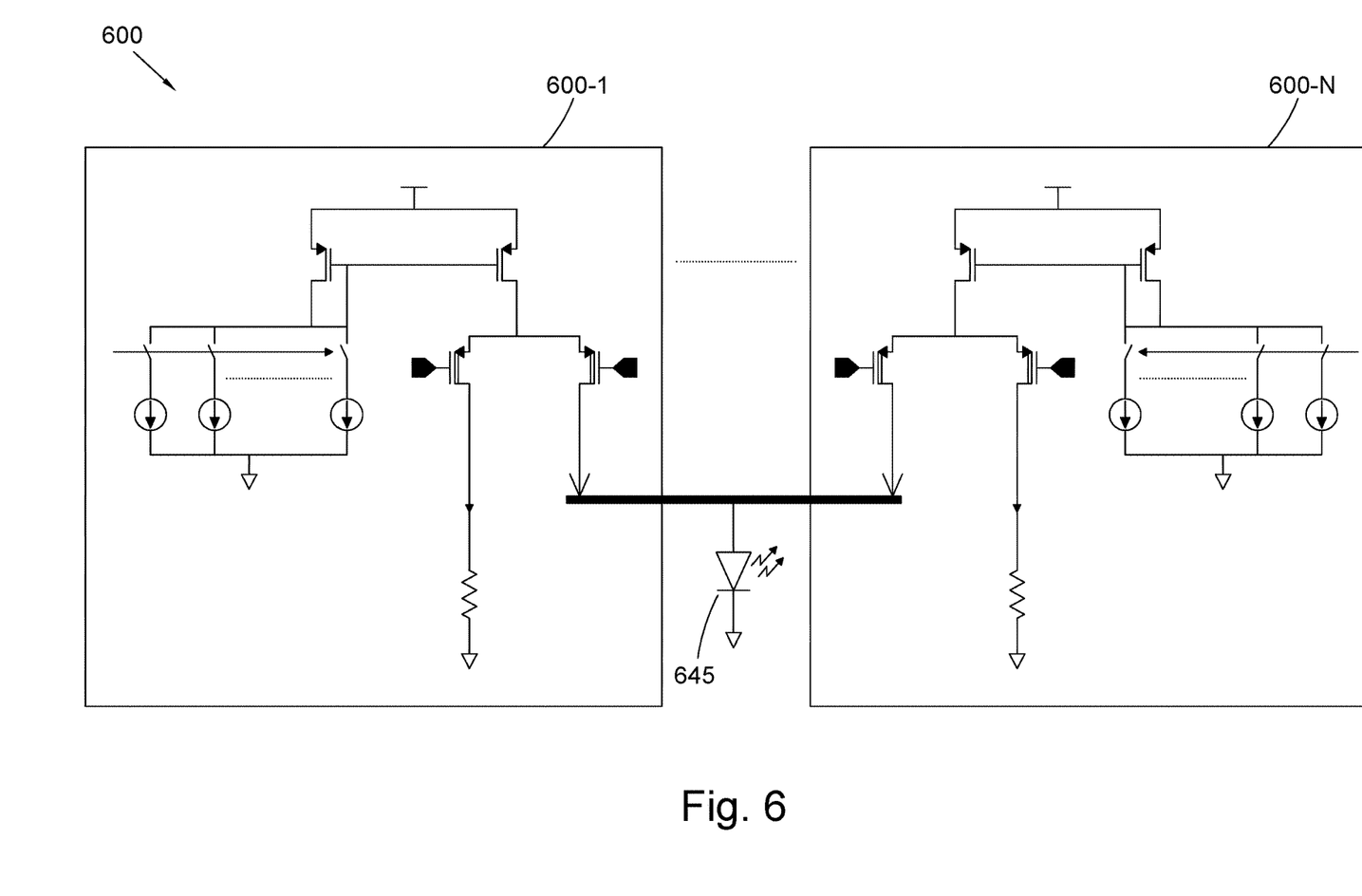
FIG. 6 depicts a laser diode driver comprising a plurality self-calibrating driver circuits, according to a further embodiment of the disclosure.

FIG. 6 depicts a laser diode driver 600 comprising a plurality self-calibrating driver circuits 600-1, 600-N, according to a further embodiment of the disclosure. An output from each of the plurality self-calibrating driver circuits 600-1, 600-N is coupled together to drive a laser diode 645. It will be appreciated that, although the embodiment of FIG. 6 depicts a single laser diode 645, in other embodiments the plurality of self-calibrating driver circuits 600-1, 600-N may be coupled to drive a plurality of laser diodes, as described in more detail with reference to FIG. 8.

That is, to obtain higher current levels as may be required to drive larger arrays of laser diodes, a quantity of self-calibrating driver circuits 600-1, 600-N may be enabled in parallel. Advantageously, the above-described modular segmented architecture enables scaling and optimisation of the drivers for driving various arrays of laser diodes, in terms of both speed and accuracy.

Figure 7:
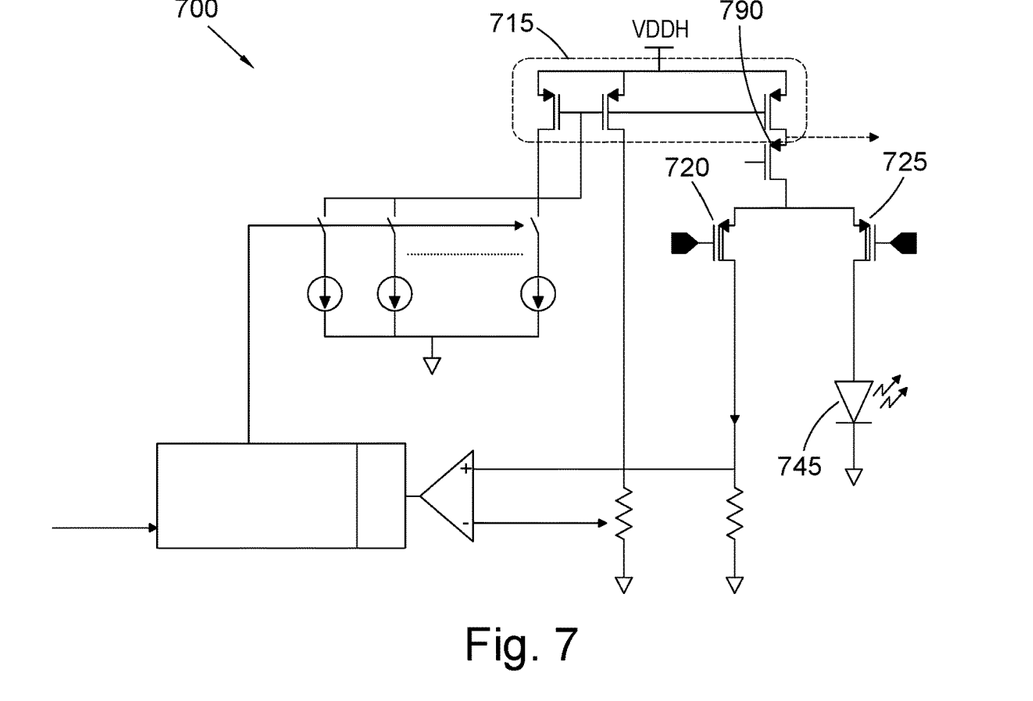
FIG. 7 depicts a self-calibrating driver circuit for individually addressing laser diodes, according to an embodiment of the disclosure.

FIG. 7 depicts a self-calibrating driver circuit 700 for individually addressing laser diodes 745 or groups of laser diodes, according to an embodiment of the disclosure. For purposes of example, the self-calibrating driver circuit 700 of FIG. 7 corresponds to the self-calibrating driver circuit 500 of FIG. 5. It will be appreciated that in other embodiments not shown, the self-calibrating driver circuit 700 of FIG. 7 may alternatively correspond to the self-calibrating driver circuits 100, 300, 400 of any of FIG. 1, 3 or 4.

The self-calibrating driver circuit 700 comprises a selection transistor 790. The selection transistor 790 is disposed in the self-calibrating driver circuit 700 between an output of a current mirror 715 and first and second transistors 720, 725. The first and second transistors 720, 725 are for monitoring a current and for driving one or more laser diodes respectively, as described with respect to the embodiments of FIGS. 1, 3, 4 and 5.

Specifically, a source of the selection transistor 790 is coupled to an output of a current mirror 715 and a drain of the selection transistor 790 is coupled to sources of the first and second transistors 720, 725. As such, a voltage-level at a gate of the selection transistor 790 controls whether current form the current mirror 715 may be coupled to the first and second transistors 720, 725.

A laser diode driver may comprise a plurality of self-calibrating driver circuits 700 as depicted in FIG. 7, wherein each self-calibrating driver circuit 700 may be configured to drive one or more laser diodes by applying a voltage to the gate of the respective selection transistor 790. As such, each self-calibrating driver circuit 700 may be individually addressable to drive one or more laser diodes 745.

Beneficially, such a flexible addressing scheme may improve an overall efficiency in terms of area, by enabling sharing of circuitry devices between different laser diode arrays.

For example, in some embodiments such a laser diode driver may comprise additional processing circuitry, such as a CPU or state machine or the like, configurable and/or programmable to select which of and/or how many of a plurality of laser diodes to enable by selectively applying a voltage to the gate of a selection transistor 790 of a selected self-calibrating driver circuit 700.

Figure 8:
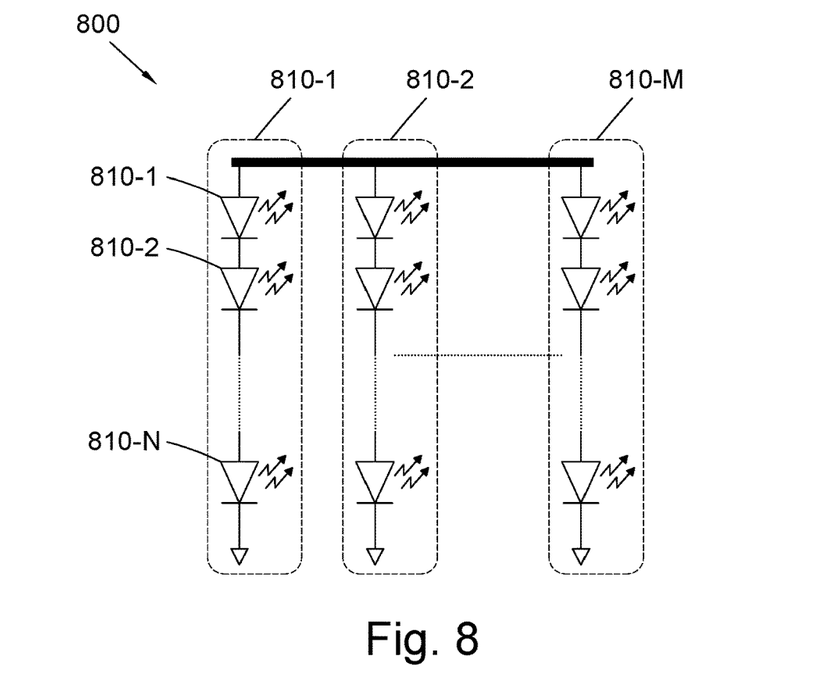
FIG. 8 depicts an array of laser diodes, for driving using a self-calibrating driver circuit according to an embodiment of the disclosure.

FIG. 8 depicts an array 800 of laser diodes, for driving using at least one self-calibrating driver circuit according to an embodiment of the disclosure. An array of laser diodes may be implemented to achieve a relatively high optical power, such as may be required in an illuminator application.

In the example array 800, a plurality of laser diodes 805-1 to 805-N are coupled in series to form a group or stack of laser diodes 810-1 to 810-M. As such, a total voltage required to drive such a group or stack of laser diodes 810-1 to 810-M may be equivalent to N x a voltage required to drive a single laser diode of the group or stack 810-1 to 810-M of laser diodes.

In the example laser diode array 800, a plurality of groups or stacks 810-1 to 810-M of laser diodes may be coupled in parallel. As such, a total current required to drive such an arrangement of laser diodes may be equivalent to M x a current required to drive a single group or stack of laser diodes 810-1 to 810-M.

The circuit forming the array 800 may represent a 2D VCSEL array.

A cathode of each group or stack 810 of laser diodes may be connected to a common GND and an anode of each group or stack 810 of laser diodes may be coupled to one or more self-calibrating driver circuits according to an embodiment of the disclosure.

In an example embodiment, an array 800 of laser diodes may comprise in the region of 40 VCSELs. For example, the array may be arranged as 4×10 VCSELs. A current required to drive such an array may be in the region of 12 Amps.

Figure 9:
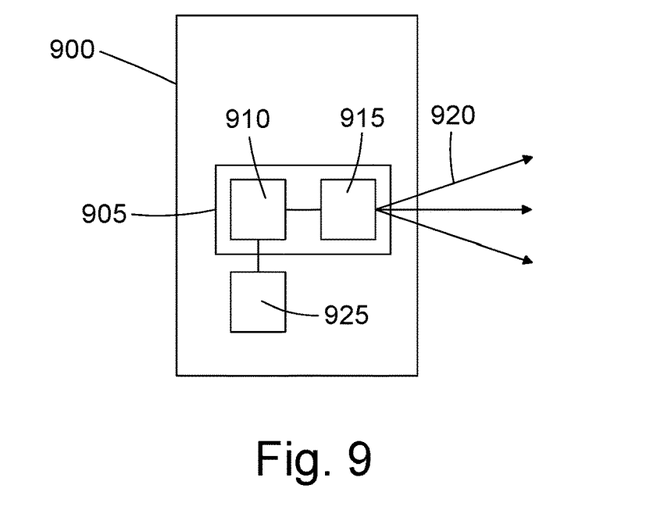
FIG. 9 depicts an example apparatus comprising a self-calibrating driver circuit for a laser diode, according to an embodiment of the disclosure.

FIG. 9 depicts an example apparatus 900 comprising a radiation-emitting device 905. The radiation-emitting device 905 is, for purposes of example, an infrared illuminator. It will be appreciated that the disclosure is also applicable to other apparatuses comprising radiation-emitting devices, in particularly VCSELs, such as tablets, laptops, LIDAR arrangement, or the like.

The radiation-emitting device 905 comprises a self-calibrating driver circuit 910 as described above with reference to FIGS. 1 to 7. In some embodiments, the radiation-emitting device 905 may comprise a plurality of self-calibrating driver circuits 910, as described above with reference to FIGS. 6 and 7. The radiation-emitting device 905 also comprises an array of laser diodes 915. The self-calibrating driver circuit 910 is configured to drive the array of laser diodes 915 such that array of laser diodes 915 emits radiation 920, as denoted by the arrows in FIG. 9. In some embodiments, the apparatus 900 is used in an eye-safety application, wherein an intensity of radiation emitted by the array of laser diodes 915 must be carefully controlled to provide adequate performance, yet avoid exceeding a threshold above which eye-damage may occur. Advantageously, the disclosed fully integrated self-calibrating driver circuit 910 provides the required degree of control and accuracy.

The example apparatus 900 comprises a controller 925. The controller 925 may be configured to control the radiation-emitting device 905. For example, in some embodiments the controller provides the second clock signal 220 to the self-calibrating driver circuit 910, as described above with reference to FIG. 2. In particular, the controller 925 may control a duty cycle and/or frequency of the second clock signal 220, thus controlling a current used to drive the array of laser diodes 915, and hence a power supplied to the array of laser diodes 915.

Figure 10:
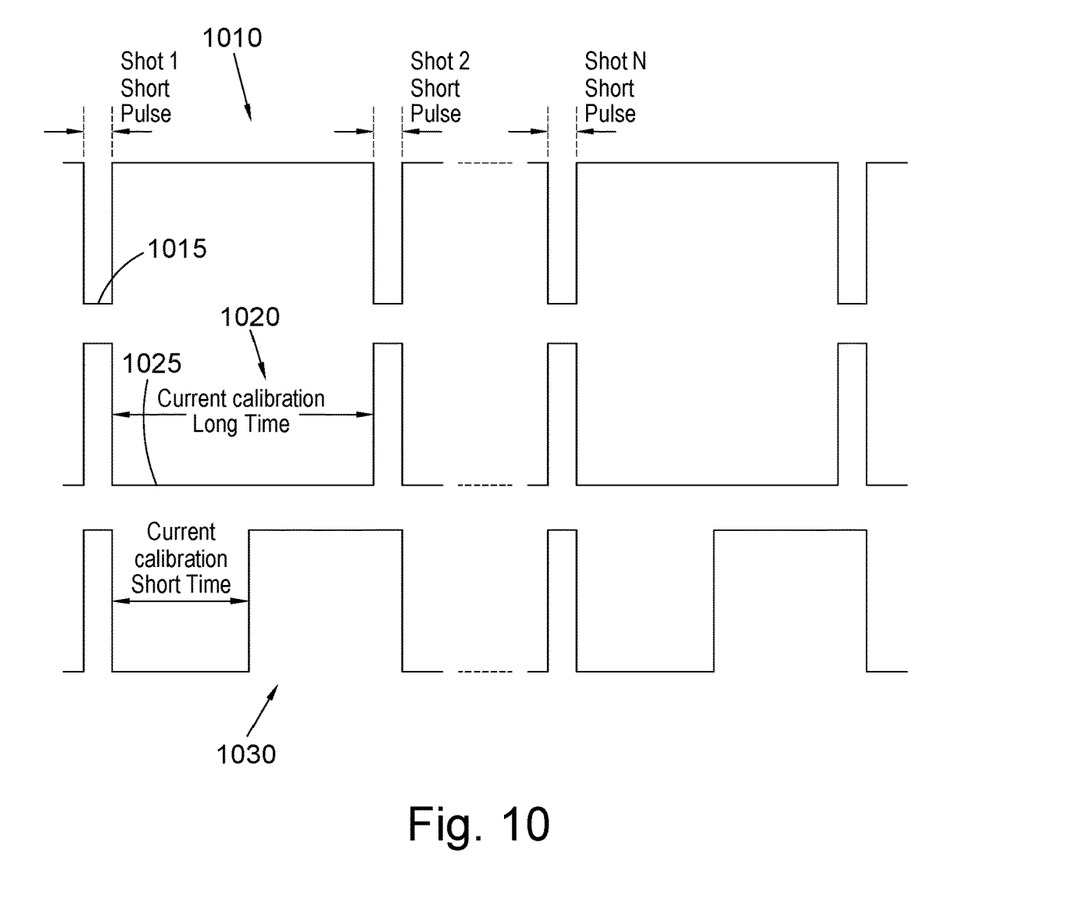
FIG. 10 depicts examples of timing diagrams for the self-calibrating driver circuit for a laser diode, according to embodiments of the disclosure.

FIG. 10 depicts examples of timing diagrams for the self-calibrating driver circuit 100, 300, 400, 500 for a laser diode, according to embodiments of the disclosure. The timing diagrams depict a first signal 1010 that may be seen at the first input 180 of the self-calibrating driver circuit 100, 300, 400, 500 for example as driven by trigger circuit 200. The first signal 1010 comprises a relatively short pulse 1015 which may enable the second transistor 125, 325, 425, 525 to drive the laser diode 145. In an example embodiment, the short pulse 1015 may have a duration in the region of 5 nanoseconds, or less.

The timing diagrams also depict a second signal 1020. The second signal 1020 may be seen at the second input 185 of the self-calibrating driver circuit 100, 300, 400, 500, for example as driven by trigger circuit 200. The second signal 1020 is the inverse of the first signal 1010. As described above with reference to the example embodiment of a trigger circuit 200, the inverter 260 may invert an input signal to provide an inverted signal, thus providing the first signal 1010 and the second signal 1020.

The second signal 1020 comprises a relatively long pulse 1025, which may for example configure the first transistor 120, 320, 420, 520 to enable a current flow for calibrating the configurable current source 105. As such, in a time between the relatively short pulses 1015 of the first signal 1010, the self-calibrating driver circuit 100, 300, 400, 500 may be calibrated such that subsequent relatively short pulses 1015 provide a desired current-level.

For purposes of example, a third signal 1030 is also depicted. The third signal also corresponds to a signal that may configure the first transistor 120, 320, 420, 520 to enable a current flow for calibrating the configurable current source 105. As can be seen this example, a duration for calibrating the configurable current source 105 may be reduced in instances wherein a corresponding duration for driving the laser diode 145, e.g. with a signal corresponding to the inverse of the third signal 1030, is increased.

Furthermore, signals provided to the self-calibrating driver circuits 100, 300, 400, 500 may be periodic, e.g. clock signals or the like, or may comprises varying pulse widths as required to calibrate the self-calibrating driver circuits 100, 300, 400, 500 and/or to provide a required current, e.g. average current, to one or more laser diodes 145. For example, the third signal 1030 depicts a series of relatively long pulses and relatively short pulses. Thus is will be understood that although references have been made above to the use of 'clock' signals, e.g. second clock signal 220, it will be appreciated that other waveforms or signals, such as pulse-trains comprising pulses of varying duration, may be implemented to control the self-calibrating driver circuits 100, 300, 400, 500. Although the disclosure has been described in terms of particular embodiments as set forth above, it should be understood that these embodiments are illustrative only and that the claims are not limited to those embodiments. Those skilled in the art will be able to make modifications and alternatives in view of the disclosure, which are contemplated as falling within the scope of the appended claims. Each feature disclosed or illustrated in the present specification may be incorporated in any embodiments, whether alone or in any appropriate combination with any other feature disclosed or illustrated herein.

| LIST OF REFERENCE NUMERALS | |
| --- | --- |
| 100 | self-calibrating driver circuit |
| 105 | configurable current source |
| 105-1-N | individual current sources |
| 110-1-N | switches |
| 115 | current mirror |
| 120 | first transistor |
| 125 | second transistor |
| 130 | third transistor |
| 135 | fourth transistor |
| 140 | control circuit |
| 145 | laser diode |
| 150 | first resistor |
| 155 | comparator |
| 160 | processing circuitry |
| 165 | finite state machine |
| 170 | bidirectional counter |
| 175 | first clock signal |
| 180 | first input |
| 185 | second input |
| 200 | trigger circuit |

LIST OF REFERENCE NUMERALS

| | |
|---|---|
| 205 | second resistor |
| 210 | fifth transistor |
| 215 | sixth transistor |
| 220 | second clock signal |
| 225 | first output |
| 230 | second output |
| 235 | third resistor |
| 240 | fourth resistor |
| 245 | seventh transistor |
| 250 | eighth transistor |
| 255 | fifth resistor |
| 260 | inverter |
| 265 | first time |
| 270 | second time |
| 300 | self-calibrating driver circuit |
| 305 | configurable current source |
| 315 | current mirror |
| 320 | first transistor |
| 325 | second transistor |
| 345 | laser diode |
| 340 | control circuit |
| 355 | current comparator |
| 360 | processing circuity |
| 365 | finite state machine |
| 370 | bidirectional counter |
| 400 | self-calibrating driver circuit |
| 405 | configurable current source |
| 415 | current mirror |
| 420 | first transistor |
| 425 | second transistor |
| 440 | control circuit |
| 455 | ADC |
| 460 | processor |
| 500 | self-calibrating driver circuit |
| 505 | configurable current source |
| 520 | first transistor |
| 550 | first resistor |
| 590 | reference transistor |
| 595 | reference resistor |
| 600 | laser diode driver |
| 600-1-N | self-calibrating driver circuits |
| 700 | self-calibrating driver circuit |
| 715 | current mirror |
| 720 | first transistor |
| 725 | second transistor |
| 745 | laser diodes |
| 790 | selection transistor |
| 800 | array |
| 805-1-N | laser diodes |
| 810-1-M | stack of laser diodes |
| 900 | apparatus |
| 905 | radiation-emitting device |
| 910 | self-calibrating driver circuit |
| 915 | array of laser diodes |
| 920 | radiation |
| 925 | controller |
| 1010 | first signal |
| 1015 | short pulse |
| 1020 | second signal |
| 1025 | long pulse |
| 1030 | third signal |

The invention claimed is:

1. A self-calibrating driver circuit (100, 300, 400, 500, 700) for a laser diode, the circuit comprising:
a configurable current source (105, 305, 405, 505);
a current mirror (115, 315, 415) configured to mirror a current from the configurable current source to a first transistor (120, 320, 420, 520, 720) and to a second transistor (125, 325, 425, 725); and
a control circuit (140, 340, 440),
wherein the control circuit is configured to monitor a current through the first transistor at a first time, and to configure the current source based on the current through the first transistor to provide a desired current to the second transistor for driving the laser diode (145, 345) at a subsequent second time.

2. The self-calibrating driver circuit (100, 300, 400, 500, 700) of claim 1, wherein the control circuit (140, 340, 440) comprises a comparator (155, 355) configured to monitor the current through the first transistor (120, 320, 420, 520, 720) by comparing:
a voltage across a resistor (150, 550) due to the current through the first transistor to a voltage reference; or
the current through the first transistor to a reference current.

3. The self-calibrating driver circuit (100, 300, 400, 500, 700) of claim 1, wherein the control circuit (140, 340, 440) comprises an analogue-to-digital converter (455) configured to monitor the current through the first transistor (120, 320, 420, 520, 720) by measuring the current through the first transistor or a voltage due to the current through the first transistor.

4. The self-calibrating driver circuit (100, 300, 400, 500, 700) of claim 1, wherein an input to the self-calibrating driver circuit is a clock signal and wherein a high level of the clock signal corresponds to one of the first and the second time, and a low level of the clock signal corresponds to the other of the first and the second time.

5. The self-calibrating driver circuit (100, 300, 400, 500, 700) of claim 1, comprising a trigger-circuit (200) coupled to a gate of the first transistor (120, 320, 420, 520, 720) and a gate of the second transistor (125, 325, 425, 725).

6. The self-calibrating driver circuit (100, 300, 400, 500, 700) of claim 5, wherein the trigger-circuit is configurable between a first and second state, wherein:
in the first state a voltage at the gate of the first transistor (120, 320, 420, 520, 720) enables current flow through the first transistor and a voltage at the gate of the second transistor (125, 325, 425, 725) inhibits current flow through the second transistor; and
in the second state a voltage at the gate of the first transistor inhibits current flow through the first transistor and a voltage at the gate of the second transistor enables current flow through the second transistor.

7. The self-calibrating driver circuit (100, 300, 400, 500, 700) of claim 1, wherein the control circuit (140, 340, 440) comprises at least one of:
a bidirectional counter (170, 370), wherein a direction of counting of the bidirectional counter corresponds to the monitored current, and a value of the counter corresponds to configuration of the current source; and/or
processing circuitry (160, for configuring the current source based on the monitored current.

8. The self-calibrating driver circuit (100, 300, 400, 500, 700) of claim 1, wherein the self-calibrating driver circuit is fabricated in a Bipolar-CMOS-DMOS (BCD) process.

9. A laser diode driver (600) comprising a plurality of self-calibrating driver circuits (100, 300, 400, 500, 700) according to claim 1.

10. The laser diode driver (600) of claim 9, wherein each self-calibrating driver circuit comprises a third transistor coupled to an output from the current mirror (115, 315, 415) for selectively inhibiting current flow from the current mirror to the respective first transistor (120, 320, 420, 520, 720) and/or second transistor (125, 325, 425, 725).

11. The laser diode driver (600) of claim 9, wherein an output of the second transistor (125, 325, 425, 725) of each of the self-calibrating driver circuits of the plurality of self-calibrating driver circuits is coupled to one or more radiation-emitting devices.

12. A radiation-emitting device (905) comprising:
one or more self-calibrating driver circuits (910) according to claim 1; and
at least one radiation-emitting element,
wherein the one or more self-calibrating driver circuits is configured to drive the at least one radiation-emitting device to emit radiation (920).

13. The radiation-emitting device (905) of claim 12, wherein the at least one radiation-emitting element comprises one or more VCSELs.

14. The radiation-emitting device (905) of claim 12 wherein each self-calibrating driver circuit (910) is individually addressable to drive one or more of the at least one radiation-emitting elements.

15. An apparatus comprising a radiation-emitting device (905) according to claim 12, wherein the apparatus is one of a cellular telephone, a smartphone, a tablet, a laptop, or a LIDAR arrangement, and wherein the radiation-emitting device is one of a proximity sensor, a time-of-flight sensor, or an illuminator.

\* \* \* \* \*